(12) United States Patent
McCormick et al.

(10) Patent No.: US 9,156,050 B2
(45) Date of Patent: Oct. 13, 2015

(54) FLUID CIRCULATION VALVE ASSEMBLY FOR FLUID PROPORTIONER

(75) Inventors: Martin P. McCormick, Forest Lake, MN (US); Gregory A. Regenscheid, Maple Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 418 days.

(21) Appl. No.: 13/701,107

(22) PCT Filed: Jun. 24, 2011

(86) PCT No.: PCT/US2011/001130
§ 371 (c)(1),
(2), (4) Date: Nov. 30, 2012

(87) PCT Pub. No.: WO2011/162822
PCT Pub. Date: Dec. 29, 2011

(65) Prior Publication Data
US 2013/0081715 A1    Apr. 4, 2013

Related U.S. Application Data

(60) Provisional application No. 61/358,330, filed on Jun. 24, 2010.

(51) Int. Cl.
*F16K 11/22* (2006.01)
*F16K 11/076* (2006.01)
(Continued)

(52) U.S. Cl.
CPC ........... *B05B 12/1445* (2013.01); *B01F 15/047* (2013.01); *B05B 12/14* (2013.01);
(Continued)

(58) Field of Classification Search
CPC . B05B 12/1445; B01F 15/047; B29B 7/7447; F16K 11/22; F16K 11/076; Y10T 137/86163; Y10T 137/8782; Y10T 137/87804; Y10T 137/86871
USPC ............... 137/625.47, 625.19, 872, 874, 876, 137/565.33; 417/426; 222/145.5
See application file for complete search history.

(56) References Cited

U.S. PATENT DOCUMENTS 3,534,569 A * 10/1970 Doell .............................. 68/165
5,332,125 A *  7/1994 Schmitkons et al. ............. 222/1
(Continued)

FOREIGN PATENT DOCUMENTS

EP          0993873 A2    4/2000
JP          59012743 A    1/1984
(Continued)

OTHER PUBLICATIONS

International Search Report for PCT Application Serial No. PCT/US2011/001130, dated Feb. 21, 2012, 11 pages.
(Continued)

*Primary Examiner* — Atif Chaudry
(74) *Attorney, Agent, or Firm* — Kinney & Lange, P.A.

(57) ABSTRACT

A fluid circulation valve assembly comprises a valve body and first and second pressure relief valves. The valve body comprises two inlets to receive output of fluid pumps, two outlets to direct fluid from the two inlets out of the valve body, respectively, and two overpressure outlets to direct fluid from the twos out of the valve body, respectively. The first and second pressure relief valves intersect the two inlets, the two outlets and the two overpressure outlets, respectively. Each pressure relief valve comprises a spring operated overpressure valve configured to open an inlet to an overpressure outlet at an overpressure condition; and a manually operated valve having a first position configured to fluidly connect an inlet to an outlet while not affecting operation of the overpressure valve, and a second position configured to fluidly connect an inlet to an overpressure outlet while opening the overpressure valve.

19 Claims, 7 Drawing Sheets

(51) Int. Cl.
  B05B 12/14   (2006.01)
  B01F 15/04   (2006.01)
  B29B 7/74   (2006.01)
  F16K 11/20   (2006.01)

(52) U.S. Cl.
  CPC ............ B29B 7/7447 (2013.01); F16K 11/076 (2013.01); F16K 11/207 (2013.01); F16K 11/22 (2013.01); *Y10T 137/7801* (2015.04); *Y10T 137/86163* (2015.04); *Y10T 137/86871* (2015.04); *Y10T 137/8782* (2015.04); *Y10T 137/87804* (2015.04)

(56) References Cited

U.S. PATENT DOCUMENTS

| | | |
|---|---|---|
| 5,965,433 A | 10/1999 | Gardetto et al. |
| 6,131,770 A | 10/2000 | Allen |
| 6,168,308 B1 * | 1/2001 | Pittman et al. ............. 366/162.3 |
| 6,315,442 B1 | 11/2001 | Jerked |

FOREIGN PATENT DOCUMENTS

| | | |
|---|---|---|
| JP | 61023078 A | 2/1986 |
| JP | 05-044677 A | 2/1993 |
| JP | 5044677 A | 2/1993 |
| JP | 10122159 A | 5/1998 |
| JP | 2000202348 A | 7/2000 |
| JP | 2007319840 A | 12/2007 |
| JP | 2008138784 A | 6/2008 |

OTHER PUBLICATIONS

Nagato & Partners, Translation of the Office Action, Mar. 18, 2015, 9 pages.

* cited by examiner

FLUID CIRCULATION VALVE ASSEMBLY FOR FLUID PROPORTIONER

BACKGROUND

The present invention relates generally to plural-component spray systems. In particular, the present invention relates to pressure relief systems for reciprocating fluid proportioners having at least two pumps.

Fluid proportioners comprise dispensing systems that receive separate inert fluid components, mix the components in a predetermined ratio and then dispense the components as an activated compound. For example, fluid proportioners are used to dispense epoxies and polyurethanes that solidify after mixing of a resin component and an activating material, which are individually inert. However, after mixing an immediate chemical reaction begins taking place that results in the cross-linking, curing, and solidification of the mixture. Therefore, the two components are routed separately into the proportioner so that they can remain segregated as long as possible. A manifold receives each component after it is pumped separately and mixes the components so the mixture can be dispensed from a sprayer coupled to the manifold.

A typical fluid proportioner comprises a pair of positive displacement pumps that individually draw in fluid from separate fluid hoppers and pump pressurized fluids to the mix manifold. The pumps are driven in synchronicity by a common motor, typically an air motor or hydraulic motor, having a reciprocating drive shaft. Most two component epoxies and polyurethanes are not, however, comprised of a 1:1 ratio of the components. Typically a first major component is needed in a higher concentration than a second minor component. In such a case, displacement of one pump is required to be larger than the other. The components are routed from the pumps to the mix manifold for blending. Additionally, a fluid manifold is positioned between the pumps and the mix manifold to permit each fluid to be independently circulated by its pump without mixing, thus segregating the mixing and curing part of the spray process from the pumping and pressurization part.

Because the fluids are circulated under high pressure, it is also desirable to provide pressure relief valves throughout the proportioner system. In particular, if one of the fluid lines becomes plugged, or one of the hoppers runs out of fluid, the other functioning pump will take the full force of the drive motor, causing an overpressure condition. For example, if a 4:1 mix ratio proportioner is spraying at 4,000 psi (~27.6 MPa) and the major component pump runs out of fluid, the minor component pump will develop four times the normal operating pressure, or 16,000 psi (~110.3 MPa). Excess pressures need to be vented to prevent failure of parts and unsafe conditions.

Typical proportioners include rupture disks that are permanently sealed, but open by tearing or bursting when overpressure conditions occur. Rupture disks can only be used one time and are used as secondary or back-up systems. Once the rupture disk breaks, the proportioner must be taken out of action until the disk can be replaced. Additionally, over pressure relief valves are used as the primary relief system. Relief valves are spring loaded and are set to open at a specific overpressure. The relief valves drain back to the hoppers or drain cans through drain lines. Ideally, the relief valves are not frequently used. As such, the relief valves and lines have a tendency to become plugged by the accumulation of dried and crystallized fluid from the previous use. This causes the relief valves to open at a much higher pressure or, in extreme cases, to not open at all. As such, there is a need to provide proportioners with more reliable and reusable relief valve systems.

SUMMARY

A fluid circulation valve assembly for a fluid proportioner comprises a valve body and first and second pressure relief valves. The valve body comprises first and second inlets to receive output of fluid pumps, first and second outlets to direct fluid from the first and second inlets out of the valve body, respectively, and first and second overpressure outlets to direct fluid from the first and second inlets out of the valve body, respectively. The first and second pressure relief valves intersect the first and second inlets, first and second outlets and first and second overpressure outlets, respectively. Each pressure relief valve comprises a spring operated overpressure valve configured to open an inlet to an overpressure outlet at an overpressure condition, and a manually operated valve having a first position configured to fluidly connect an inlet to an outlet while not affecting operation of the overpressure valve, and a second position configured to fluidly connect an inlet to an overpressure outlet while opening the overpressure valve.

DETAILED DESCRIPTION

Figure 1:
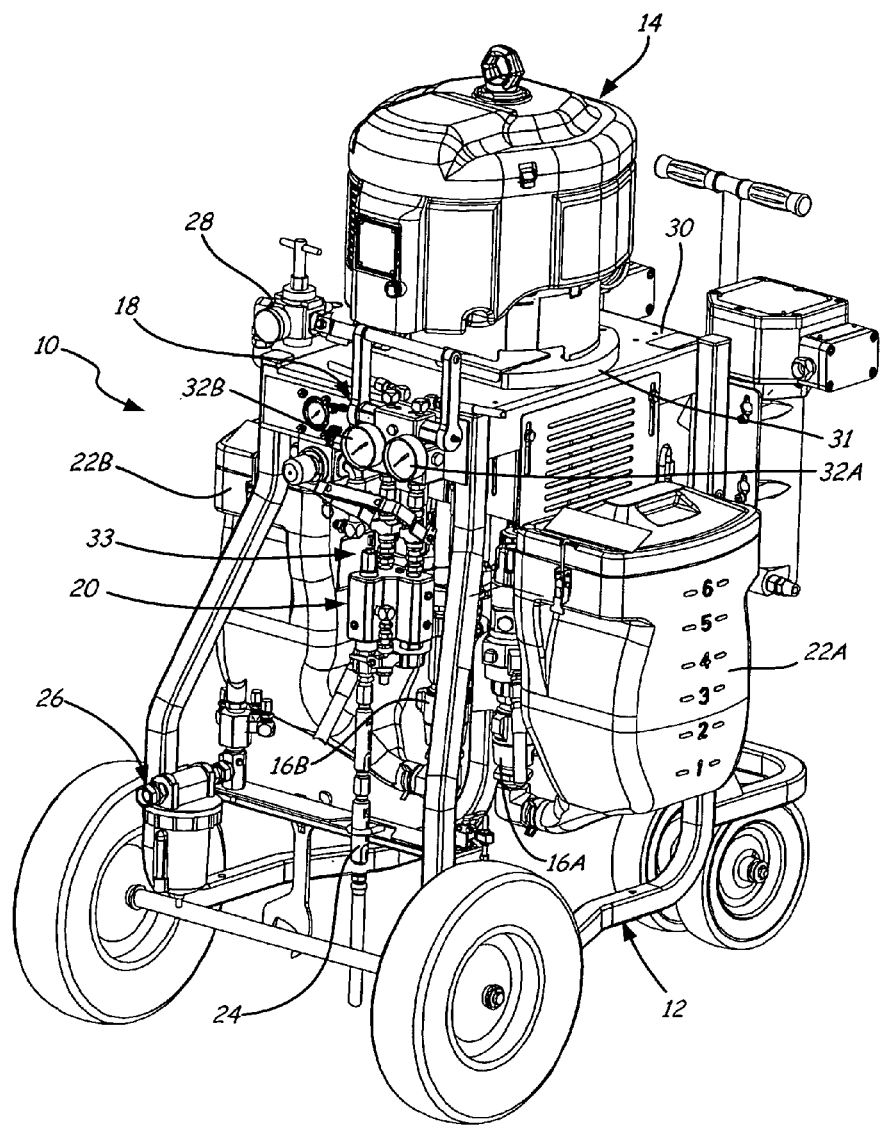
FIG. 1 is a perspective view of a dual pump proportioner system having a fluid control assembly comprising a fluid manifold and a mix manifold.

FIG. 1 is a perspective view of dual pump proportioner system 10 of the present invention. Proportioner system 10 is mounted on cart 12 and includes air motor 14, fluid pumps 16A and 16B, fluid manifold 18, mix manifold 20 and fluid hoppers 22A and 22B. Air motor 14 drives pumps 16A and 16B such that fluid from hoppers 22A and 22B is mixed in mix manifold 20 before being dispensed by a spray gun (not shown) coupled to outlet 24. High pressure air is provided to system 10 at air inlet 26. A hose (not shown) connects air inlet 26 to main air control 28, which includes a switch or valve for feeding pressurized air to air motor 14. Air motor 14 is mounted to platform 30 of cart 12 using mounting plate 31. Air motor 14 comprises any conventional air motor as is known in the art. In other embodiments, a hydraulic motor is used. However, any motor having a reciprocating shaft may be used. As is discussed in detail with reference to FIGS. 2 and 3, pumps 16A and 16B are supported underneath air motor 14 such that air motor 14 can actuate pumps 16A and 16B. Operation of air motor 14 causes fluid within hoppers 22A and 22B to be drawn into pumps 16A and 16B, respectively, and pushed out to fluid manifold 18. Pumps 16A and 16B comprise conventional positive displacement pumps having reciprocating pump shafts, as are known in the art. Fluid manifold 18 controls flow of fluid to mix manifold 20, keeping the fluid components separated until after pumping. Mix manifold 20 blends the fluids on their way to outlet 24. Fluid manifold 18 includes pressure gauges 32A and 32B, which provide an indication of the fluid pressures generated by pumps 16A and 16B, respectively.

Operation of proportioner system 10 is discussed with reference to FIGS. 2 and 3. As discussed in detail with reference to FIG. 4, fluid manifold 18 and mix manifold 20 together comprise fluid control assembly 33. As discussed with reference to FIG. 5, fluid manifold 18 includes valves that simultaneously provide overpressure relief and drain valves for pumps 16A and 16B of proportioner system 10. Operation of fluid manifold 18 is explained with reference to FIGS. 6A and 6B.

Figure 2:
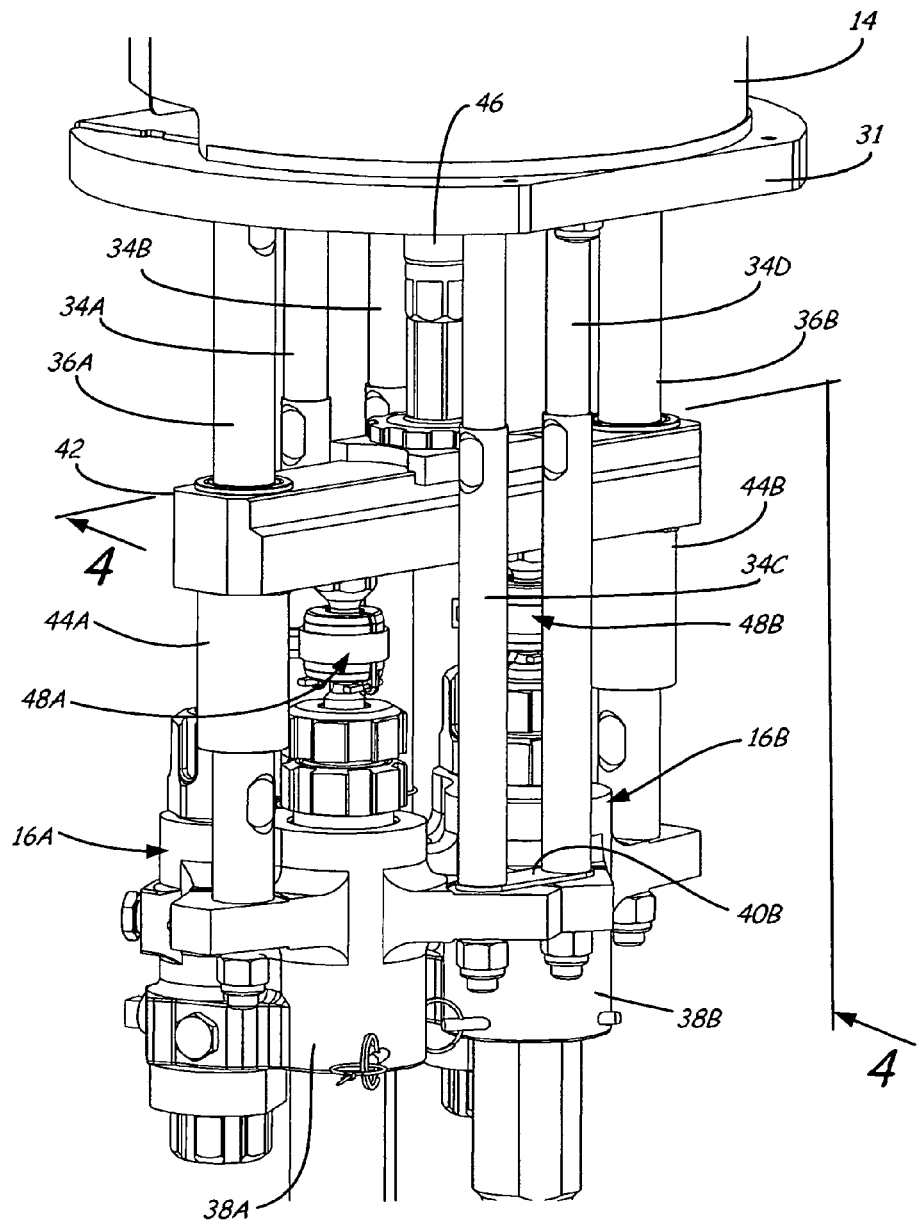
FIG. 2 is a close-up perspective view of a back side of the dual pump proportioner system of FIG. 1 showing tie rods coupling an air motor to a pair of pumps.

FIG. 2 is a close-up perspective view of a back side of dual pump proportioner system 10 of FIG. 1 showing support tie rods 34A-34D and pump tie rods 36A and 36D coupling air motor 14 to pumps 16A and 16B. FIG. 2 shows the rear side of air motor 14 and pumps 16A and 16B with respect to the front of system 10 shown in FIG. 1. Air motor 14 is coupled to mounting plate 31. Tie rods 34A-34D are coupled to plate 31 at their uppermost ends and coupled to pump housings 38A and 38B at their lowermost ends. Specifically, tie rods 34A, 34C and 36A connect pump housing 38A of pump 16A to mounting plate 31, and tie rods 34B, 34D and 36B connect pump housing 38B of pump 16B to mounting plate 31. Housings 38A and 38B are coupled together with link 40A (shown in FIG. 3), which connects to tie rods 34A and 34B. Another link 40B (FIGS. 2 and 3) is coupled to tie rods 34C and 34D. Links 40A and 40B connect adjacent tie rods that are joined to different pump housings. The uppermost ends of tie rods 36A and 36B are coupled to mounting plate 31 and the lowermost ends are coupled to pump housings 38A and 38B, respectively. Tie rods 36A and 36B extend through yoke 42. Bushings 44A and 44B surround tie rods 36A and 36B, respectively, within yoke 42. Drive shaft 46 extends from air motor 14, through mounting plate 31, and couples to yoke 42. Yoke 42 also couples with pump shafts 48A and 48B of pumps 16A and 16B, respectively. Reciprocation of pump shafts 48A and 48B produces flow of fluids into fluid manifold 18 of fluid control assembly 33 of FIGS. 1 and 4.

Drive shaft 46 reciprocates yoke 42, which glides along tie rods 36A and 36B with the aid of bushings 44A and 44B, respectively. Yoke 42 reciprocates pump shafts 48A and 48B, which cause pumps 16A and 16B to draw fluid from hoppers 22A and 22B and to push fluid into fluid manifold 18, as discussed with reference to FIG. 1. Tie rods 34A-34D and tie rods 36A and 36B maintain pump housings 38A and 38B stationary with respect to air motor 14 and plate 31. Yoke 42 and piston shafts 48A and 48B reciprocate between mounting plate 31 and pump housings 38A and 38B under power from drive shaft 46.

Figure 3:
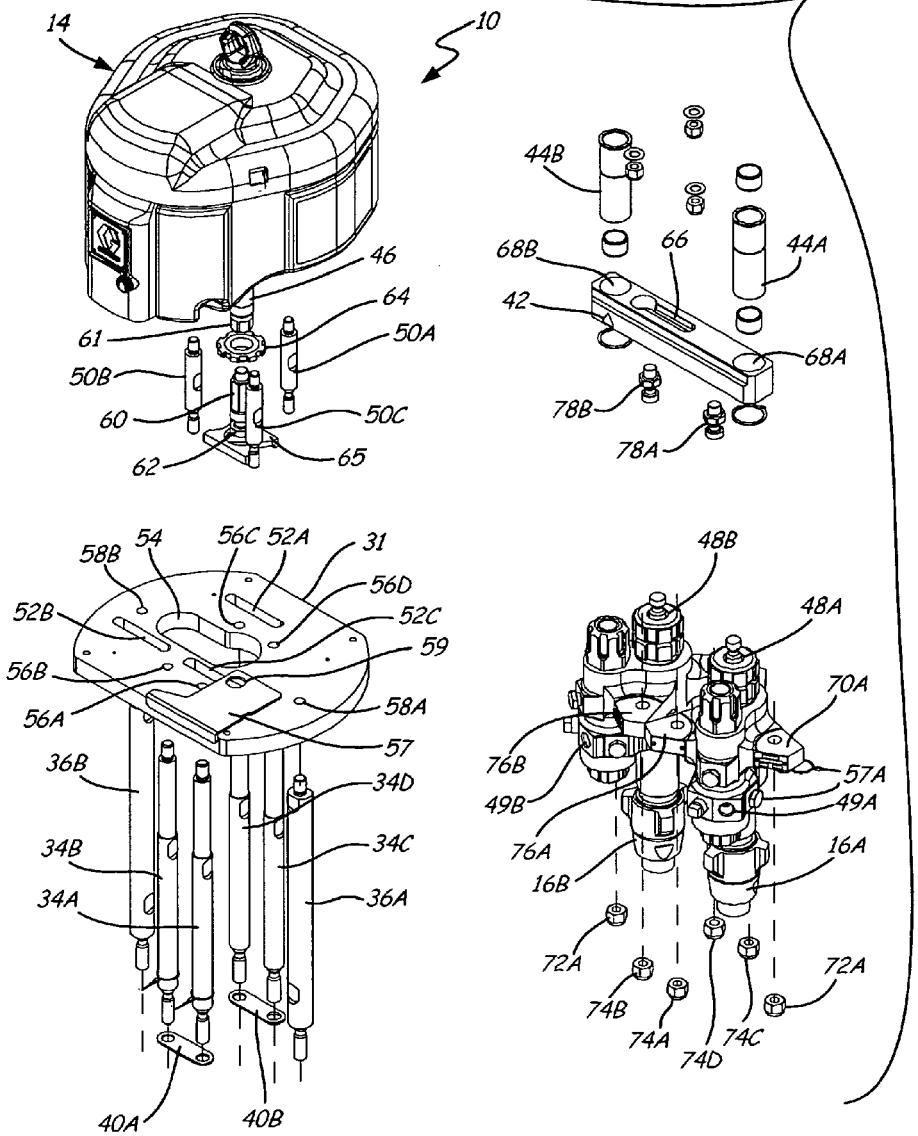
FIG. 3 is an exploded perspective view of the dual pump proportioner system of FIGS. 1 and 2 showing coupling of the air motor and pumps to a mounting plate.

FIG. 3 is an exploded perspective view of dual pump proportioner system 10 of FIGS. 1 and 2. System 10 includes air motor 14 and pumps 16A and 16B. Air motor 14 is coupled to mounting plate 31 using motor tie rods 50A-50C, and pumps 16A and 16B are coupled to mounting plate 31 using support tie rods 34A-34D and pump tie rods 36A and 36B. Mounting plate 31 includes slots 52A-52C, motor opening 54, bores 56A-56D and bores 58A and 58B. When assembled, motor tie rods 50A-50C extend into slots 52A-502C. Tie rods 34A-34D are fastened to bores 56A-56D, respectively. When assembled, pump tie rods 36A and 36B are fastened to bores 58A and 58B, respectively, at their upper ends, and coupled with yoke 42 at their lower ends. Motor shaft 46 extends into shaft bore 54. Motor shaft 46 includes extension 60 and coupler 61. Extension 60 includes head 62 for coupling with yoke 42. Extension 60 includes nut 64 and gauge 65 is fitted around extension 60 to ride along mounting plate 31. When assembled, nut 64 is tightened down on gauge 65 to immobilize extension 60 (and drive shaft 46) with respect to yoke 42. Tie rods 36A and 36D extend from bores 58A and 58B down to yoke 42 when assembled. Yoke 42 includes shaft slot 66 and tie rod bores 68A and 68B. Tie rods 36A and 36D pass through bushings 44A and 44B and bores 68A and 68B, respectively. Pump tie rods 36A and 36B couple to pump housings 38A and 38B, respectively. For example, tie rod 36A is secured to flange 70A using nut 72A. Tie rod 36B is similarly secured to a flange (not shown) using nut 72B. Likewise, support tie rods 34A-34D extend down from mounting plate 31 to tabs located on pump housings 38A and 38B and are secured with nuts 74A-74D. For example, tie rods 34A and 34B couple to tabs flanges 76A and 76B using nuts 74A and 74B, respectively. Adapters 78A and 78B of pump shafts 48A and 48B are joined to couplers on the underside of yoke 42. Reciprocation of drive shaft 46 is achieved by alternating the introduction of pressurized air into opposite sides of a piston within housing 80, thus causing yoke 42 to ride on pump tie rods 36A and 36B and pump shafts 48A and 48B to be actuated. Pumps shafts 48A and 48B produce outflows of fluids from outlets 49A and 49B, respectively. Pump housings 38A also includes rupture disk 57A, which provides a fail safe overpressure outlet for pump 16A. Typically, rupture disks are only provided on the smaller pump that is more susceptible to overpressure from the motor. Outlets 49A and 49B are fluidly coupled to fluid control assembly 33.

Figure 4:
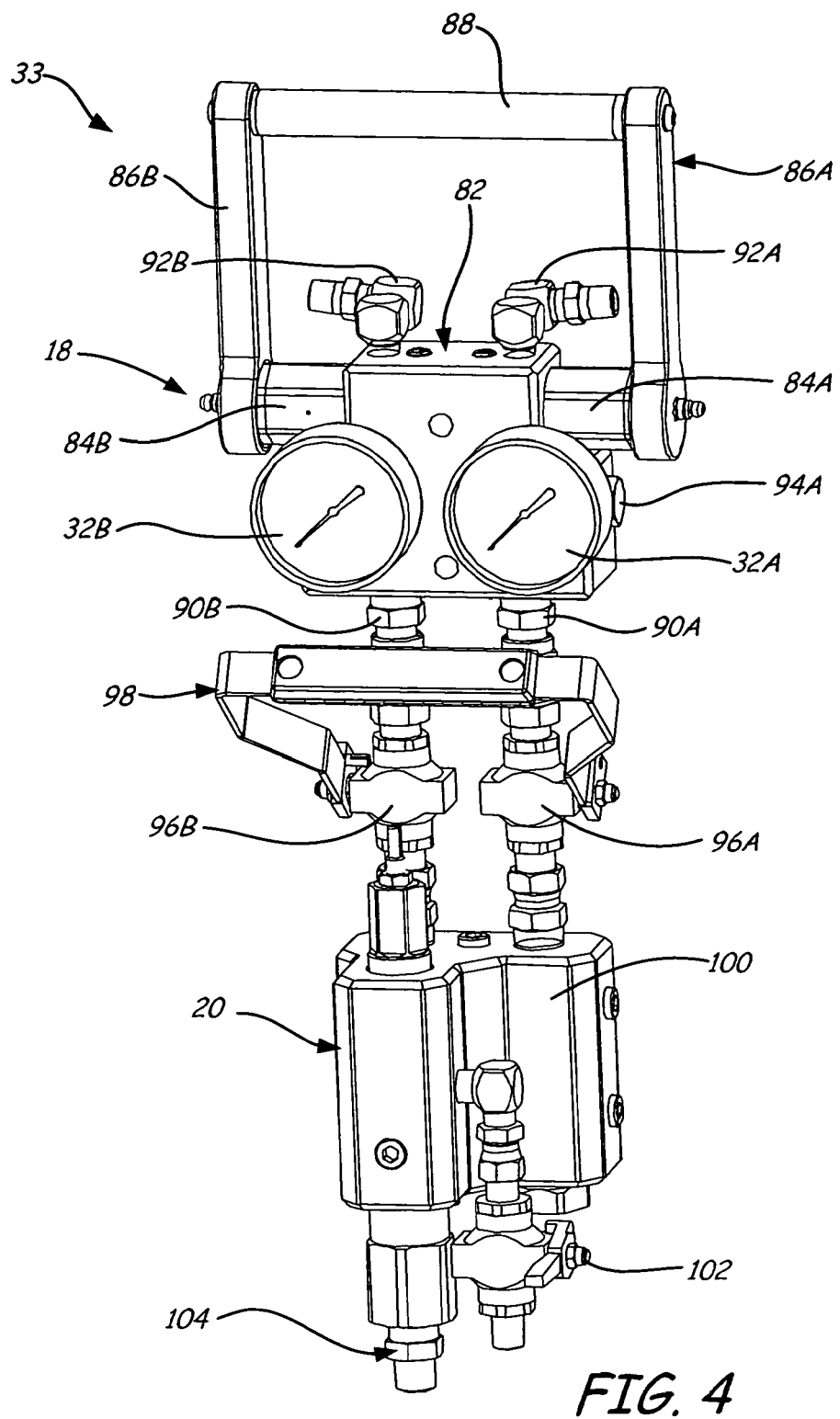
FIG. 4 is a perspective view of the fluid control assembly of FIG. 1 showing the fluid manifold and the mix manifold.
Figure 5:
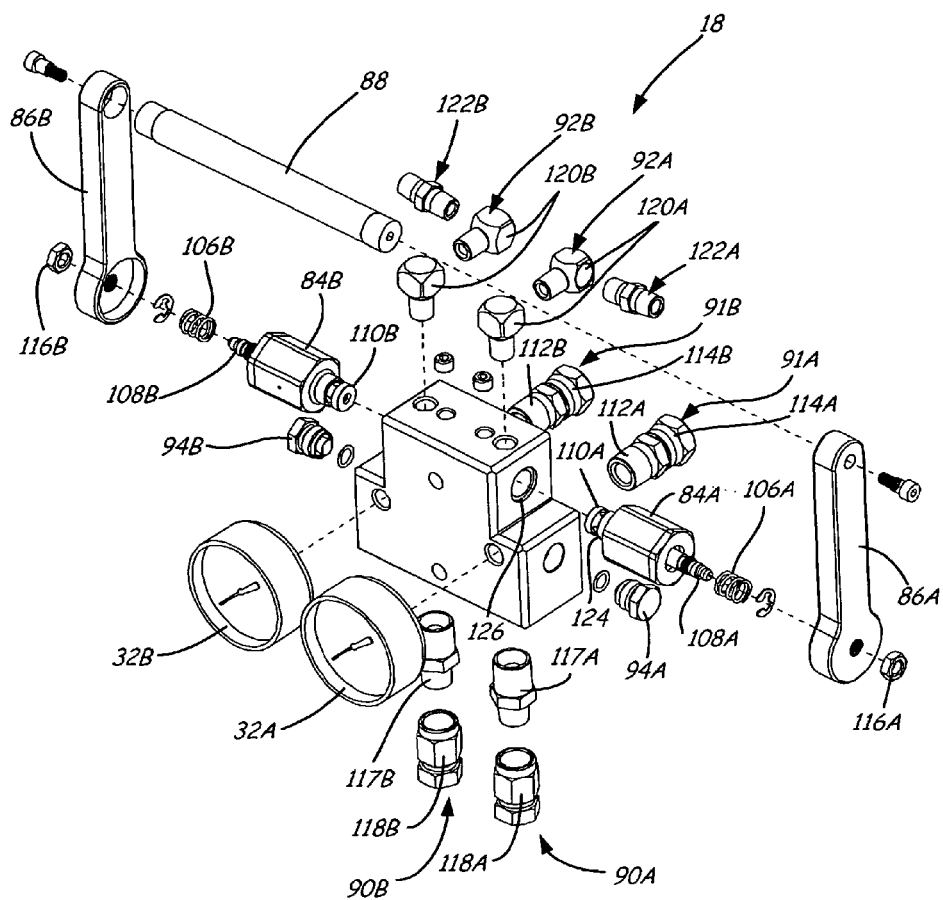
FIG. 5 is an exploded view of the fluid manifold of FIG. 4 showing pressure relief valves coupled by a common actuation handle.

FIG. 4 is a perspective view of fluid control assembly 33 of FIG. 1 showing fluid manifold 18 and mix manifold 20. As shown in FIG. 1, fluid control assembly 33 is mounted on cart 12 of proportioner 10. In other embodiments, fluid control assembly 33 can be uncoupled from cart 12 so as to enable remote operation of proportioner 10. Fluid manifold 18 includes first pressure gauge 32A, second pressure gauge 32B, valve body 82, first drain valve 84A, second drain valve 84B, first valve lever 86A, second valve lever 86B, handle 88, first outlet 90A, second outlet 90B, first recirculation or overpressure outlet 92A, second recirculation or overpressure outlet 92B, plug 94A and plug 94B (FIG. 5). Mix manifold 20 includes first shut-off valve 96A, second shut-off valve 96B, handle 98, manifold body 100, solvent flush mechanism 102 and outlet 104.

Valve body 82 of fluid manifold 18 comprises a block through which various flow paths are machined to connect drain valves 84A and 84B with outlets 90A and 90B, outlets 92A and 92B and plugs 94A and 94B. Valve body 82 is provided with fluid from outlets 49A and 49B of pumps 16A and 16B (FIG. 3). The fluid is routed through drain valves 84A and 84B to outlets 90A and 90B. Levers 86A and 86B toggle drain valves 84A and 84B between recirculation mode positions and spray mode positions. Handle 88 ensures that valves 84A and 84B are in the same position and switched at the same time. With handle 88 in the up position as shown in FIG. 4, fluid manifold is in a spray mode. With handle 88 in a down position, fluid manifold 18 is in a recirculation mode. Pressure gauges 32A and 32B indicate the pressure of each fluid within valve body 82, as generated by pumps 16A and 16B, respectively. Outlets 92A and 92B are coupled to a fluid container to collect fluid circulated out of valve body 82. Outlets 90A and 90B are connected to shut-off valves 96A and 96B, respectively, of mix manifold 20.

Shut-off valves 96A and 96B provide output control of proportioner system 10. Shut-off valves 96A and 96B provide fluid inputs to mix manifold body 100, which combines the individual flows of each fluid into a single, mixed flow that exits mix manifold body 100 at outlet 104. Solvent flush mechanism 102 allows solvent to be introduced into and flushed from mix manifold 20 to clean out mixed fluid components before they fully cure and harden. Mix manifold outlet 104 is coupled to proportioner outlet 24 (FIG. 1), which couples to a spray gun or any suitable spraying device.

FIG. 5 is an exploded view of fluid manifold 18 of FIG. 4 showing drain valves 84A and 84B coupled by common actuation handle 88. Fluid manifold 18 includes inlets 91A and 91B in addition to the elements as listed with respect to FIG. 4. Drain valve 84A comprises spring 106A, valve stem 108A and valve head 110A. Likewise, drain valve 84B comprises spring 106B, valve stem 108B and valve head 110B.

Inlets 91A and 91B comprise fittings 112A and 112B that can be threaded or otherwise coupled to valve body 82. Additionally, inlets 91A and 91B include fittings 114A and 114B that permit hoses from outlets 49A and 49B of pumps 16A and 16B, respectively, to be coupled to fluid manifold 18. Outlets 90A and 90B comprise fitting 116A and 116B that can be threaded or otherwise coupled to valve body 82. Additionally, outlets 90A and 90B include fittings 118A and 118B that permit hoses to join outlets 90A and 90B of fluid manifold 18 with shut-off valves 96A and 96B, respectively, of mix manifold 20. Recirculation outlets 92A and 92B comprise fitting 120A and 120B that can be threaded or otherwise coupled to valve body 82. Additionally, recirculation outlets 92A and 92B include fittings 122A and 122B that permit hoses to join outlets 92A and 92B of fluid manifold 18 with hoppers 22A and 22B (FIG. 1), respectively, of proportioner system 10. Rupture disk 57A is also threaded into housing 38A of pump 16A. Rupture disk 57A includes a membrane that bursts when pressures feeding valve body 82 from pump 16A exceed predetermined threshold levels, as is known in the art.

Valves 84A and 84B are coupled to valve body 82 at valve heads 110A and 110B. Valve heads 110A and 110B are threaded or otherwise coupled to bores in valve body 82, respectively. For example, neck 124 of valve head 110A is threaded into bore 126 such that passages within head 110A extend into bore 114. Valve heads 110A and 110B are joined to valve stems 108A and 108B, respectively, within valves 84A and 84B. Springs 106A and 106B are slid over valve stems 108A and 108B, respectively. Levers 86A and 86B are positioned on valve stems 108A and 108B, respectively, to compress springs 106A and 106B, and secured with nuts 116A and 116B. Springs 106A and 106B and cams within valves 84A and 84B control axial movement of valve heads 110A and 110B to control fluid flow through outlets 92A and 92B, while valve stems 108A and 108B and levers 86A and 86B control rotational movement of valve heads 110A and 110B to control fluid flow through outlets 90A and 90B.

Figure 6A:
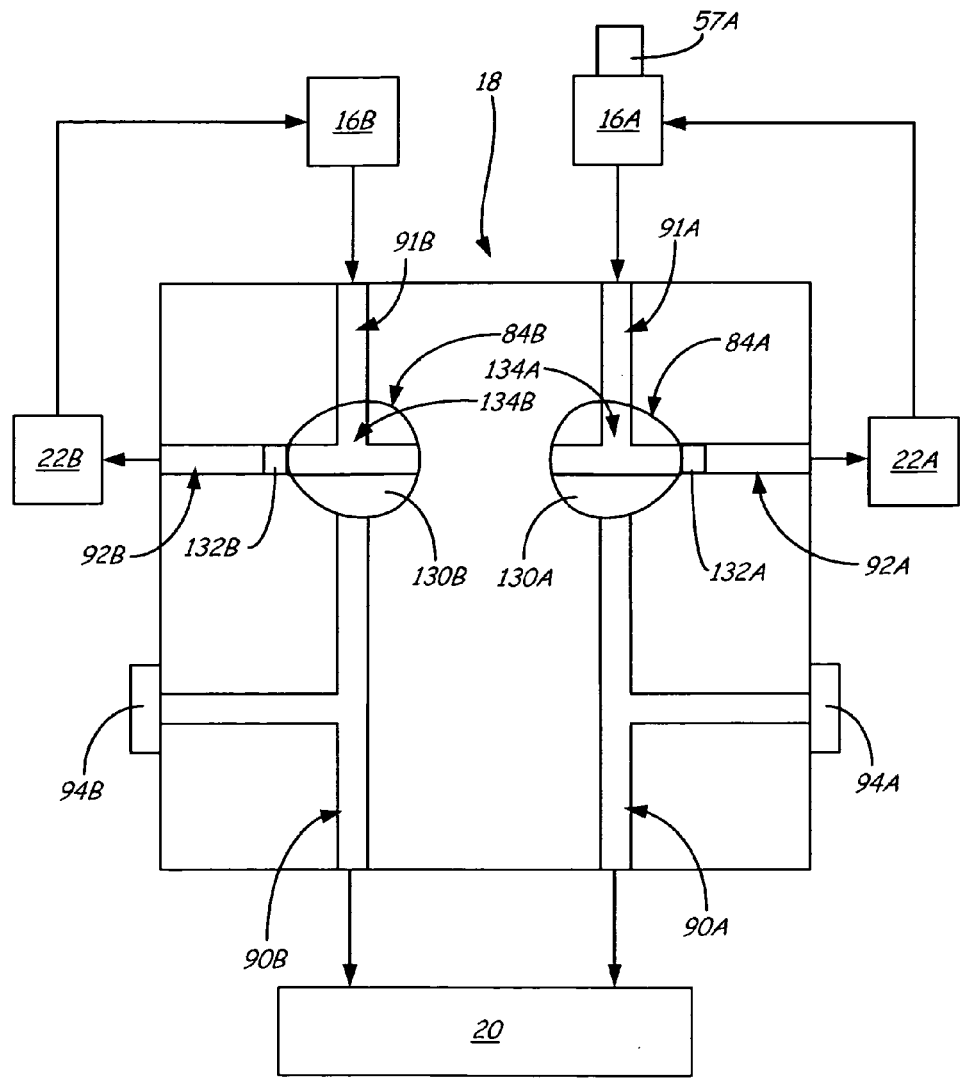
FIG. 6A is a schematic diagram of the pressure relief valves of FIG. 5 with the actuation handle in a closed, recirculation mode position.
Figure 6B:
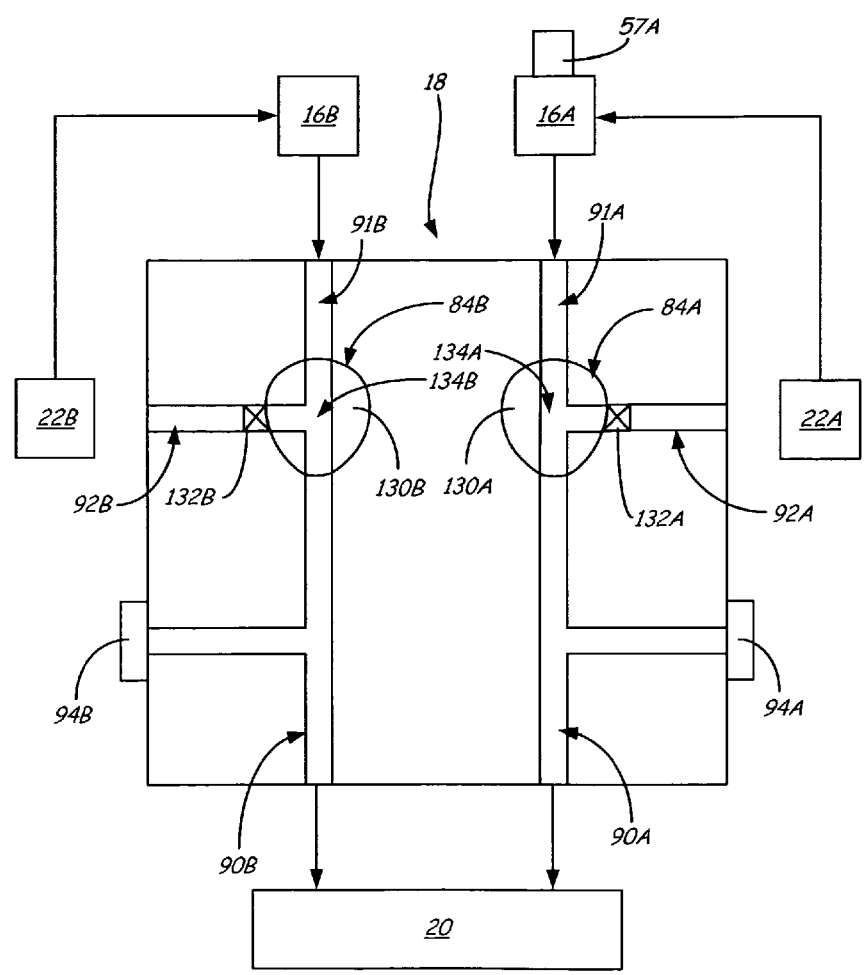
FIG. 6B is a schematic diagram of the pressure relief valves of FIG. 5 with the actuation handle in an open, spray mode position.

Springs 106A and 106B bias valve heads 110A and 110B into positions to block flows from inlets 91A and 91B to outlets 92A and 92B, respectively. If pressures within valves 84A and 84B exceed the spring force of springs 106A and 106B, outlets 92A and 92B will be opened. Additionally, levers 86A and 86B can be rotated to adjust cams within valves 84A and 84B to manually compress springs 106A and 106B and open outlets 92A and 92B. Operation of levers 86A and 86B also control flow of fluid to outlets 90A and 90B, respectively. Specifically, levers 86A and 86B rotate valve stems 108A and 108B to align porting in head 110A and 110B to connect inlets 91A and 91B with outlets 92A and 92B, respectively, when in the recirculation mode as shown in FIG. 6A. Alternatively, levers 86A and 86B rotate valve stems 108A and 108B to align porting in head 110A and 110B to connect inlets 91A and 91B with outlets 90A and 90B, respectively, when in the spray mode as shown in FIG. 6B.

FIG. 6A is a schematic diagram of drain valves 84A and 84B of FIG. 5 with actuation handle 88 in a closed, recirculation mode position. FIG. 6B is a schematic diagram of drain valves 84A and 84B of FIG. 5 with actuation handle 88 in an open, spray mode position. FIGS. 6A and 6B show schematic representations of drain valves 84A and 84B.

As shown in FIG. 6A, drain valve 84A includes fluid control valve head 130A and overpressure relief valve 132A. Drain valve 84B includes fluid control valve head 130B and overpressure relief valve 132B. Pump 16A draws in fluid from hopper 22A and provides pressurized fluid to drain valve 84A through inlet 91A. Inlet 91A is coupled to fittings 120A and 122A, as shown in FIG. 5. Pump 16B draws in fluid from hopper 22B and provides pressurized fluid to drain valve 84B through inlet 91B. Inlet 91B is coupled to fittings 120B and 122B, as shown in FIG. 5.

Head 130A is oriented to a recirculation position such that passageways 134A connect inlet 91A to overpressure outlet 92A. Oriented as such, head 130A interacts with overpressure relief valve 132B to permit fluid through overpressure outlet 92A. Specifically, head 130A includes a cam that opens overpressure relief valve 132A by overcoming a spring force that normally maintains valve 132A in a closed state. Head 130A also closes of flow from inlet 91A to outlet 90A. Head 130B acts upon overpressure relief valve 132B in a similar fashion. In other embodiments of the invention, cams may be positioned on other portions of valves 84A and 84B, such as valve stems 108A and 108B (FIG. 5). Outlets 92A and 92B include fittings 120A, 120B, 122A and 122B, respectively, shown in FIG. 5.

In such a configuration, fluid is not sent to mix manifold 20. Fluid manifold 18 acts to circulate fluid from hoppers 22A and 22B out of fluid manifold 18. Overpressure outlets 92A and 92B can be coupled to hoppers 22A and 22B, respectively, in the recirculation mode. Such a configuration is used to prime pumps 16A and 16B with component material from hoppers 22A and 22B. Overpressure outlets 92A and 92B can be coupled to other fluid containers, cans, bottles or the like to capture fluid circulated from pumps 16A and 16B through fluid manifold. 18. Such a configuration is used to circulate solvent through proportioner 10. For example, clean solvent is placed in hoppers 22A and 22B, circulated through pumps 16A and 16B where it collects residual material, and dirty solvent is collected in separate fluid containers. Solvent is independently used to clean mix manifold 20 using solvent flush mechanism 102 (FIG. 4).

As shown in FIG. 6B, proportioner system 10 is configured in a spray mode. Specifically, valve heads 130A and 130B are oriented such that passages 134A and 134B connect inlets 91A and 91B to outlets 90A and 90B, respectively. Outlets 90A and 90B include fittings 116A, 116B, 118A and 118B, respectively, shown in FIG. 5. As such, pumps 16A and 16B direct fluid from hoppers 22A and 22B out to mix manifold 20. In such a configuration, fluid manifold is susceptible to overpressures from pumps 16A and 16B. Valve body 82 is provided with two independent means for overcoming overpressure conditions. First, overpressure relief valves 132A and 132B are provided in overpressure outlets to 92A and 92B to vent overpressure from inlets 91A and 91B. With heads 130A and 130B oriented as shown in FIG. 6B, cams provided on drain valves 84A and 84B are rotated by handle 88 away from overpressure relief valves 132A and 132B, respectively. As such, springs within overpressure relief valves 132A and 132B close-off overpressure outlets 92A and 92B, respectively. However, valves 132A and 132B are still fluidly coupled to pressurized fluid flowing through inlets 91A and 91B via passages 134A and 134B, respectively. If the pressurized fluid overcomes the spring force, valves 132A and 132B will open, venting excessively pressurized fluid to a separate container coupled to overpressure outlets 92A and 92B. Overpressure relief valves 132A and 132B are maintained wetted by operation of fluid manifold 18 in the priming mode as shown in FIG. 6A. As such, valves 132A and 132B are lubricated such that they open at the intended overpressure condition. If, however, for some unforeseen reason valves 132A and 132B do not open as intended, rupture disk 57A is provided on pump 16A. Rupture disk 57A is configured, as is known in the art, to intentionally fail at a predetermined pressure. Below the predetermined pressure, metallic membranes of rupture disk 57A seal allow pressurized fluid to continue to flow through outlets 90A and 90B. At or above the predetermined pressure, the membranes will tear or burst to vent excessively pressurized fluid from pump 16A. Typically, the fluid is not, however, contained. Additionally, once ruptured the disk must be replaced. As such, rupture disk 57A provides a last resort failsafe. Plugs 94A and 94B provide access to passages within valve body for maintenance and other purposes.

The present invention provides a system that maintains pressure relief valves wetted within normal operation of the proportioner system. For example, drain valves are rotated to a recirculation position to prime the proportioner pumps by routing fluid through the pressure relief valves. As such, the pressure relief valves remain lubricated to limit exposure to air and to prevent formation of dried and crystallized component fluids. As such, the pressure relief valves remain in good working condition when needed to vent actual over pressure conditions when the drain valves are operating in a spray mode. Additionally, the drain valves are manually operable to provide a pressure dump when spraying is completed, again wetting the pressure relief valves. Thus, when not in the priming or dumping mode, the pressure relief valves have been wetted such that they will readily open during an overpressure events, such as when one fluid is exhausted from a hopper.

Although the present invention has been described with reference to preferred embodiments, workers skilled in the art will recognize that changes may be made in form and detail without departing from the spirit and scope of the invention.

The invention claimed is:

1. A fluid circulation valve assembly for a fluid proportioner, the valve assembly comprising:
   a valve body comprising:
      first and second inlets to receive output of fluid pumps;
      first and second outlets to direct fluid from the first and second inlets out of the valve body, respectively; and
      first and second overpressure outlets to direct fluid from the first and second inlets out of the valve body, respectively;
   a first pressure relief valve intersecting the first inlet, first outlet and first overpressure outlet, the first pressure relief valve comprising:
      a first spring operated overpressure valve configured to open the first inlet to the first overpressure outlet at an overpressure condition; and
      a first manually operated valve having:
         a first position configured to fluidly connect the first inlet to the first outlet while not affecting operation of the first overpressure valve; and
         a second position configured to fluidly connect the first inlet to the first overpressure outlet while opening the first overpressure valve; and
   a second pressure relief valve intersecting the second inlet, second outlet and second overpressure outlet the second pressure relief valve comprising:
      a second spring operated overpressure valve configured to open the second inlet to an overpressure outlet at an overpressure condition; and
      a second manually operated valve having:
         a first position configured to fluidly connect the second inlet to the second outlet while not affecting operation of the second overpressure valve; and
         a second position configured to fluidly connect the second inlet to the second overpressure outlet while opening the second overpressure valve.

2. The fluid circulation valve of claim 1 and further comprising:
   a handle coupling the first and second pressure relief valves such that the first and second relief valves are simultaneously actuated.

3. The fluid circulation valve of claim 2 wherein each manually operated valve comprises:
   a valve head inserted into the valve body, the valve head including passages to direct fluid flow from the first or second inlet alternately to the first or second outlet and the first or second overpressure outlet, respectively; and
   a valve stem having a first end coupled to the handle and a second end coupled to the valve head.

4. The fluid circulation valve of claim 1 wherein the overpressure relief valves comprise spring-actuated valves.

5. The fluid circulation valve of claim 4 wherein the manually operated valves include a cam that actuates springs of the spring-actuated overpressure relief valves.

6. The fluid circulation valve of claim 1 and further comprising:
   first and second pressure gauges coupled to the valve body to indicate pressures in the first and second outlets.

7. The fluid circulation valve of claim 1 and further comprising:
   first and second fluid containers fluidly coupled to the overpressure outlets of the valve body.

8. The fluid circulation valve of claim 7 and further comprising:
   a motor having a drive shaft;
   first and second positive displacement pumps each comprising:
      a fluid inlet coupled to one of the first and second fluid containers;
      a pump shaft driven by the motor drive shaft; and
      a fluid outlet; and
   a mix manifold;
   wherein the valve body is fluidly disposed between the first and second pumps and the mix manifold such that the first and second inlets of the valve body are coupled to the pump fluid outlets and the outlets of the valve body are fluidly coupled to the mix manifold.

9. The fluid circulation valve of claim 8 and further comprising:
   a rupture disk coupled to the fluid outlet of the first positive displacement pump, the rupture disk configured to burst at an overpressure condition;

wherein the first positive displacement pump has a smaller volumetric displacement than the second positive displacement pump.

10. A dual pump fluid proportioner comprising:
a motor having a drive shaft;
first and second positive displacement pumps each having a pump shaft;
first and second tie rods fixedly connecting the first and second pumps to the motor;
a pump yoke slidably coupled to the first and second tie rods, and fixedly coupled to the pump shafts and drive shaft;
a mix manifold for receiving output of the first and second pumps; and
a fluid manifold fluidly coupled between the first and second pumps and the mix manifold, the fluid manifold comprising:
 a first flow control valve intersecting flow of the first pump to the mix manifold;
 a second flow control valve intersecting flow of the second pump to the mix manifold;
 a first overpressure relief valve fluidly connected to the first flow control valve;
 a second overpressure relief valve fluidly connected to the second flow control valve and
 a valve body comprising:
  first and second inlets to receive output of the first and second pumps;
  first and second outlets to direct fluid flows to the mix manifold;
  first and second overpressure outlets;
  wherein the first and second flow control valves intersect the first and second inlets, first and second outlets and first and second overpressure outlets, respectively, and the first and second overpressure relief valves intersect the first and second overpressure outlets, respectively.

11. The dual pump proportioner of claim 10 wherein the first and second flow control valves each comprise:
 a valve head configured to direct fluid flow from an inlet alternately to an outlet and an overpressure outlet.

12. The dual pump proportioner of claim 11 wherein the first and second flow control valves each include a valve stem coupled to a valve head, each valve stem coupled to a handle such that the first and second pressure relief valves are simultaneously actuated.

13. The dual pump fluid proportioner of claim 11 wherein:
 when the valve head connects an inlet to an outlet, the overpressure relief valve is pressure activated; and
 when the valve head connects an inlet to an overpressure outlet, the valve head opens the overpressure relief valve.

14. The dual pump fluid proportioner of claim 10 wherein the first and second overpressure relief valves are automatically actuated via overpressure.

15. The dual pump fluid proportioner of claim 14 wherein the first and second overpressure relief valves are spring-actuated.

16. The dual pump fluid proportioner of claim 14 wherein cams in the first and second flow control valves actuate the overpressure relief valves.

17. The dual pump fluid proportioner of claim 10 and further comprising:
 a rupture disk coupled to an outlet of the first or second positive displacement pump, the rupture disk configured to burst at an overpressure condition.

18. The dual pump fluid proportioner of claim 10 and further comprising:
 first and second fluid containers configured to receive fluid from the first and second overpressure outlets, respectively.

19. The dual pump fluid proportioner of claim 10 and further comprising:
 first and second fluid hoppers coupled to inlets of the first and second pumps, respectively;
 wherein the first and second overpressure outlets drain to the first and second hoppers, respectively.

* * * * *